UNITED STATES PATENT OFFICE.

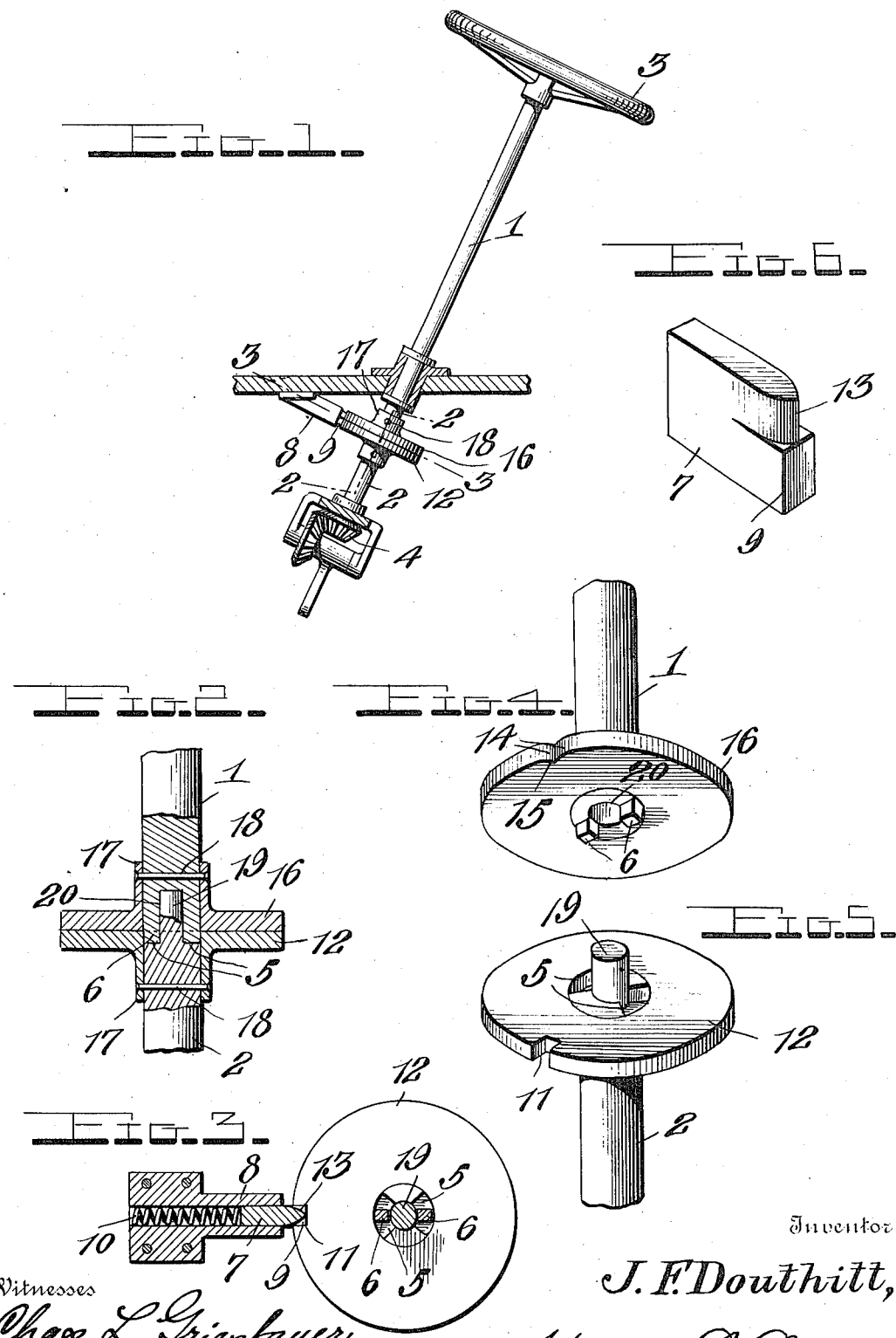

JOHN F. DOUTHITT, OF BOONVILLE, INDIANA.

STEERING DEVICE.

989,897.

Specification of Letters Patent. Patented Apr. 18, 1911.

Application filed April 25, 1910. Serial No. 557,481.

*To all whom it may concern:*

Be it known that I, JOHN F. DOUTHITT, a citizen of the United States, residing at Boonville, in the county of Warrick and State of Indiana, have invented certain new and useful Improvements in Steering Devices, of which the following is a specification, reference being had to the accompanying drawings.

This invention relates to improvements in steering devices for use on automobiles and other machines.

The object of the invention is to provide a safety device for automobiles, whereby when the machine is set to travel straight ahead it will be impossible for the steering gear to be actuated by the contact of one or both of the steering wheels with an obstruction on the road, and while my invention is especially adapted for use in connection with automobiles and other motor vehicles, it will be understood that it may be used in connection with motor boats and other machines having steering gear.

With the above and other objects in view, the invention consists of the novel construction, combination and arrangement of parts, hereinafter fully described and claimed, and illustrated in the accompanying drawings in which:—

Figure 1 is a side view of a steering device embodying my invention. Figs. 2 and 3 are longitudinal and transverse sectional views. Figs. 4 and 5 are detail views. Fig. 6 is a detail view of the catch.

In the present embodiment of the invention my improved lock and lock-controlling means for the steering gear is arranged in the steering shaft or bar of the automobile and it may be located at any suitable point throughout the length of said shaft, the latter being formed in two sections 1, 2. The upper section 1 is provided with the usual hand wheel or other operating device 3, and the lower section 2 is connected to any suitable steering gear indicated at 4. The section 1 of the shaft is adapted to have a limited rotary movement independent of the section 2 and this is accomplished by providing a clutch connection between the opposing ends of the two sections, such clutch connection consisting preferably of segmental shaped sockets 5 formed at opposite points in the upper end of the section 2 and adapted to receive oppositely arranged pins or studs 6 projecting from the lower end of the section 1, the studs 6 being of less width than the length of the sockets 5, whereby the limited independent movement of the section 1 is obtained. This independent rotary movement of the shaft section 1 is adapted to control a catch or lock, which when in its operative position is adapted to hold the section 2 of the steering shaft stationary with the steering wheels set to cause the machine to move straight ahead. The preferred form of this locking device comprises a slidable catch or bolt 7 arranged in a suitable casing 8 adapted to be secured to any stationary part of the body of the automobile or other machine. The catch 7 has a rectangular-shaped end 9 which is projected by a spring 10 into a similar shaped notch or seat 11 formed in the edge of a disk 12 carried by the shaft section 2. The projecting end of the catch 7 is also formed with a V-shaped portion 13, the inclined or converging faces of which form cams to co-act with the cam faces 14 formed by the walls of a V-shaped notch or seat 15 formed in one edge of a second disk 16. This disk 16 is opposed to the disk 12 and is carried by the upper shaft section 1.

The two parts 12, 16 are preferably in the form of disks, although they may be of other shape and of any size. When they are made separate from the shaft sections 1, 2, they are provided with hub portions 17 to receive transverse keys 18, whereby they are secured to the shaft sections. The casing 8 for the spring-projected, slidably mounted, catch or bolt 7 may be of any form and construction, but as illustrated it is T-shaped having its cross portion apertured to receive fastening screws, and its third branch made hollow to slidably receive the catch 7 and the spring 10.

Any suitable means may be provided for mounting the two shaft sections 1, 2 and maintaining them in alinement and their disks 12, 16 in opposition, and if desired I may provide on the upper extremity of the section 2 a reduced, concentrically arranged, cylindrical pin 19 to enter a socket 20 in the lower end of the shaft section 1.

In operation, when the steering gear 4 of the automobile is set to cause the machine to move straight ahead, the seat 11 in the disk 12 will be opposite the end 9 of the catch 7, and when the notch or seat 15 in the disk 16 is brought into register with the seat 11 in the disk 12, the spring 10 will project the catch 7 so that its end 9 will enter the seat 11, while its portion 13 will enter the seat 15. When the parts are thus positioned the steering gear will be locked, and owing to the peculiar shape of the parts 9, 11 it will be impossible for any obstruction on the road which may be struck by one or both of the steering wheels to cause the steering gear to be accidentally shifted. When it is desired to actuate the steering gear 4 to turn the machine in either direction, the upper shaft section 1 is turned in the proper direction, and through the limit of its independent rotary movement permitted by the shifting of the clutch lugs or pins 6 in the sockets 5. This movement of the shaft section 1 is sufficient to cause one of the inclined or cam faces 14 of the seat 15 in the disk 16 to coact with one of the inclined or cam faces of the portion 13 of the catch 7 so that the latter will be retracted against the tension of its projecting spring 10, and its end 9 will be withdrawn from the seat 11 in the disk 12, thereby unlocking the lower shaft section 2. The continued movement of the upper shaft section 1 in the same direction will then be imparted to the shaft section 2 owing to the clutch formed by the parts 5, 6, and consequently the steering gear will be actuated. When the catch 7 is thus retracted it will be held against the edges or peripheries of the two disks 12, 16 and will not enter the seats or notches 11, 15 until the latter are brought into register or alinement. This may be done by turning the upper shaft section 1 by means of the hand wheel 3, as will be readily understood.

From the foregoing it will be seen that my invention provides an exceedingly simple and effective locking device for the steering gear of a motor vehicle, and that it will effectively prevent the machine from being accidentally deflected to either side of the road when its wheels strike stones, ruts or other obstructions. Furthermore, the use of the invention will render steering much easier when the automobile or machine moves over rough roads because it will be unnecessary for the operator to constantly hold the steering hand wheel rigid in order to prevent the shifting of the steering road wheels.

While the preferred embodiments of the invention have been shown and described in detail, it will be understood that I do not wish to be limited to the precise construction set forth, since various changes in the form, proportion and arrangement of parts, and in the details of construction, may be resorted to within the spirit and scope of the invention.

Having thus described the invention, what is claimed is:

1. The combination of a rotatably mounted shaft section, a second rotatably mounted shaft section arranged in longitudinal alinement with the first section, a clutch connection between the two shaft sections, whereby the second one may have a limited rotary movement independent of the first, opposing disks fixed to the two shaft sections, the disk on the first shaft section having a catch-receiving seat and the disk on the second shaft section having a seat formed with inclined or cam surfaces and adapted to be brought into register with said catch-receiving seat, and a spring-projected catch adapted to enter said catch-receiving seat and having a V-shaped portion to enter said seat having the inclined or cam faces.

2. The combination of a rotatably mounted shaft section operatively connected to the steering means, a second rotatably mounted shaft section arranged in longitudinal alinement with the first section, and carrying a handle, one of said shaft sections having a concentrically arranged socket to receive a concentrically arranged pin projecting from the opposing end of the other shaft section, and one of said shaft sections having at opposite points, arcuate slots to receive oppositely disposed stop lugs carried by the opposing end of the other shaft section, whereby one shaft section may have a limited rotary movement with respect to the other, opposing disks carried by the opposing ends of the two shaft sections, one of said disks having in its periphery a V-shaped notch formed adjacent the cam surfaces, and the corresponding portion of the other disk having a recess with flat walls, a stationary element and a spring projected locking catch arranged in said element for movement toward and from the edges of said disks, said catch having a flat faced portion to enter said recess in one disk, and said catch also having a V-shaped portion to enter the V-shaped notch in the other disk.

In testimony whereof I hereunto affix my signature in the presence of two witnesses.

JOHN F. DOUTHITT.

Witnesses:
 FLORENCE LATSHAW,
 ORRIS SKELTON.